United States Patent
Tang et al.

(10) Patent No.: US 9,837,884 B2
(45) Date of Patent: Dec. 5, 2017

(54) MULTI-PHASE LINEAR MOTOR WITH CONTINUOUSLY WOUND COILS IN EACH PHASE

(71) Applicant: SANYO DENKI CO., LTD., Tokyo (JP)

(72) Inventors: Yuqi Tang, Tokyo (JP); Takashi Matsushita, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 567 days.

(21) Appl. No.: 14/495,114

(22) Filed: Sep. 24, 2014

(65) Prior Publication Data
US 2015/0084442 A1    Mar. 26, 2015

(30) Foreign Application Priority Data
Sep. 24, 2013  (JP) .................................. 2013-197463

(51) Int. Cl.
| | |
|---|---|
| *H02K 41/02* | (2006.01) |
| *H02K 3/28* | (2006.01) |
| *H02K 5/02* | (2006.01) |
| *H02K 9/02* | (2006.01) |

(Continued)

(52) U.S. Cl.
CPC ............. *H02K 41/02* (2013.01); *H02K 3/28* (2013.01); *H02K 3/47* (2013.01); *H02K 5/02* (2013.01); *H02K 9/02* (2013.01); *H02K 41/031* (2013.01); *Y02T 10/641* (2013.01)

(58) Field of Classification Search
CPC ........ H02K 41/00–41/065; H02K 3/28; H02K 3/52; H02K 3/528; H02K 33/00–33/18
USPC ............. 310/71, 15–37, 12.1–12.33, 15–37, 310/49.01–49.55
See application file for complete search history.

(56) References Cited

U.S. PATENT DOCUMENTS

| | | | |
|---|---|---|---|
| 6,331,746 B1 * | 12/2001 | Fujitani | .................. H01F 7/145 310/14 |
| 2007/0035197 A1 * | 2/2007 | Usui | ...................... H02K 1/187 310/257 |

(Continued)

FOREIGN PATENT DOCUMENTS

| | | |
|---|---|---|
| JP | H11225468 A | 8/1999 |
| JP | 2006303304 A | 11/2006 |

(Continued)

OTHER PUBLICATIONS

Machine Translation, Nagamatsu et al., WO 2009025162 A1, Feb. 26, 2009.*

(Continued)

*Primary Examiner* — Thomas Truong
(74) *Attorney, Agent, or Firm* — Drinker Biddle & Reath LLP

(57) ABSTRACT

A linear motor includes an excitation unit including a shaft and a plurality of permanent magnets located in the shaft, and an armature including a plurality of coils surrounding the excitation unit and a magnetic cover covering the coils. The plurality of coils of the same phase group are continuously wound over a plurality of insulative bobbins. A tap conductor, a jumper wire between the coils, and a terminal wire of the coils in different phase groups that are continuously wound are separately disposed in different corner portions in the magnetic cover, and the terminal wire of each phase is connected to a circuit board.

19 Claims, 22 Drawing Sheets

(51) Int. Cl.
   *H02K 41/03*   (2006.01)
   *H02K 3/47*    (2006.01)

(56) References Cited

U.S. PATENT DOCUMENTS

| | | | | |
|---|---|---|---|---|
| 2009/0051234 A1* | 2/2009 | Yamane | ............ | H02K 3/18 |
| | | | | 310/71 |
| 2009/0261663 A1 | 10/2009 | Aso et al. | | |
| 2010/0237728 A1* | 9/2010 | Saito | ........ | H02K 5/00 |
| | | | | 310/71 |

FOREIGN PATENT DOCUMENTS

| | | | |
|---|---|---|---|
| JP | 2007006637 A | 1/2007 | |
| JP | 2007097295 A | 4/2007 | |
| JP | 2008079358 A | 4/2008 | |
| JP | WO 2009025162 A1 * | 2/2009 | ............ H02K 41/03 |
| JP | 2009100617 A | 5/2009 | |
| JP | 2013085405 A | 5/2013 | |
| JP | 2013172043 A | 9/2013 | |
| WO | WO-2009025162 A1 | 2/2009 | |

OTHER PUBLICATIONS

Japanese Office Action dated Oct. 4, 2016 for the corresponding Japanese Patent Application No. 2013-197463.
Japanese Office Action for Japanese Application No. 2013-197463, dated Mar. 7, 2017.

* cited by examiner

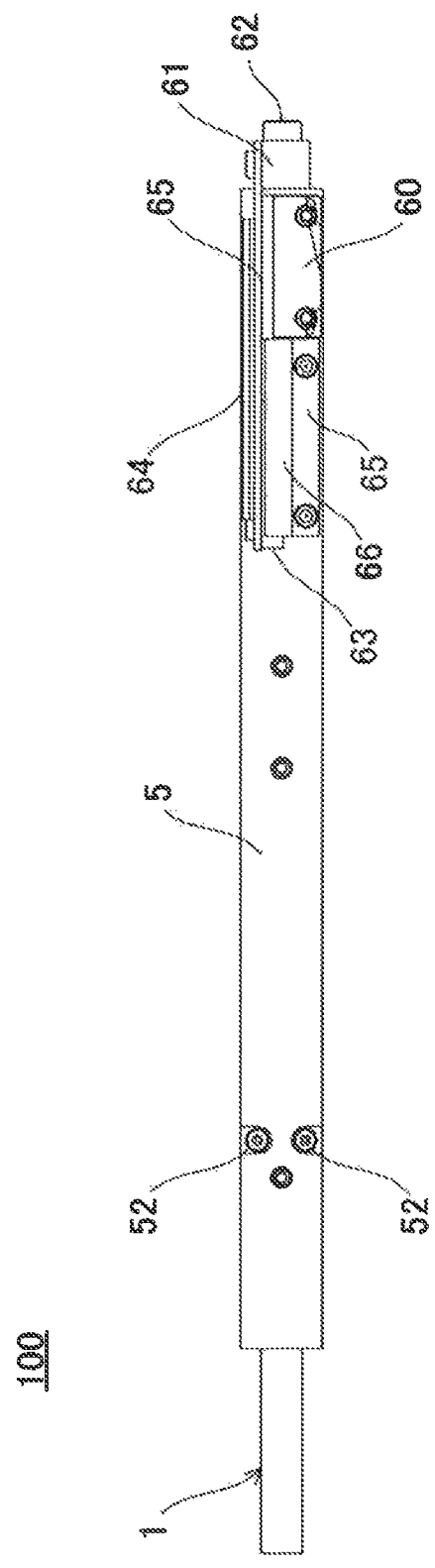

MULTI-PHASE LINEAR MOTOR WITH CONTINUOUSLY WOUND COILS IN EACH PHASE

CROSS-REFERENCE TO RELATED APPLICATIONS

This application claims priority to Japanese Application No. 2013-197463, filed Sep.24, 2013.

BACKGROUND

1. Technical Field

The present invention relates to a linear motor that gives a linear thrust to an object to be driven, utilizing electromagnetic induction.

2. Description of Related Art

A rod-type linear motor includes a rod with permanent magnets, and coils surrounding the rod, and gives a thrust force to the rod in the axial direction thereof utilizing electromagnetic induction arising from the magnetic field of the permanent magnets and current running on the coils.

The rod-type linear motor can be easily built in a small size, yet exhibits high performance because of the advantages such as simple structure and small cogging force from fluctuation of the magnetic flux. The rod-type linear motor is employed, for example, in a chip mounter of semiconductor manufacturing equipment.

In the aspect of the armature of the rod-type linear motor, for example Japanese Unexamined Patent Application Publication No. 2007-97295 (Patent Literature 1) discloses a linear motor including air-core coils connected on a wire connection plate and encapsulated in a resin.

As another example, Japanese Unexamined Patent Application Publication No. 2007-6637 (Patent Literature 2) discloses a linear motor including air-core coils arranged on a printed circuit board so as to constitute the armature.

Further, Japanese Unexamined Patent Application Publication No. 2009-100617 (Patent Literature 3) discloses a shaft-type linear motor in which coils are connected to a printed circuit board fixed to a flange portion attached to one of two divided semicircular yokes.

In the linear motors according to the Patent Literatures 1 to 3, the lead of the coil of the armature is connected to the circuit board. The circuit board is disposed in the axial direction of the rod (shaft). Such a configuration increases the width of the armature, which is disadvantageous to reduction in size of the armature.

In addition, in the case where the coil of each phase is not continuously wound, the phases are defined via the circuit board. In this case the number of connection points to the circuit board is increased, which degrades the wiring work efficiency for arranging the lead of each phase and the ground wire.

SUMMARY

The present invention has been accomplished in view of the foregoing problem, and provides a linear motor that improves the wiring work efficiency for arranging the lead of each phase and the ground wire and enables reduction in size of the armature.

In an aspect, the present invention provides a linear motor including an excitation unit including a shaft and a plurality of permanent magnets located in the shaft, and an armature including a plurality of coils surrounding the excitation unit and a magnetic cover covering the coils.

The plurality of coils of the same phase group are continuously wound over a plurality of insulative bobbins. A tap conductor, a jumper wire between the coils, and a terminal wire of the coils in different phase groups that are continuously wound are separately disposed in different corner portions in the magnetic cover, and the terminal wire of each phase is connected to a circuit board.

In the linear motor thus configured, the plurality of coils of the same phase group are continuously wound over the plurality of insulative bobbins. Therefore, the wiring work of the jumper wire between the coils can be minimized.

The tap conductor, the jumper wire between the coils, and the terminal wire of the coils of a different phase group that are continuously wound are separately disposed in different corner portions in the magnetic cover. Therefore, the corner portions which are dead spaces in the magnetic cover can be effectively utilized, which enables reduction in size of the armature.

Further, only the terminal of the insulated shielded wire of each phase is connected to the circuit board. Therefore, the number of connection points to the circuit board is reduced, which leads to improved wiring work efficiency of the lead of each phase and the ground wire.

BRIEF DESCRIPTION OF THE DRAWINGS

FIG. 2C is a bottom view showing the linear motor according to the first embodiment.

DETAILED DESCRIPTION

Hereafter, a linear motor according to first to fifth embodiments will be described with reference to the drawings.

In the linear motor according to the first to fifth embodiments, a plurality of coils of the same phase group are continuously wound over a plurality of insulative bobbins. The tap conductor of the coil of each phase, jumper wires between the coils, and terminal wires are dividedly disposed in different corner portions in the magnetic cover, and only the terminal of the insulated shielded wire of each phase is connected to the circuit board.

With the linear motor according to the first to fifth embodiments, therefore, wiring work efficiency of the lead of each phase and the ground wire can be improved, and the size of the armature can be reduced.

[First Embodiment]
[Configuration of Linear Motor]

Figure 1:
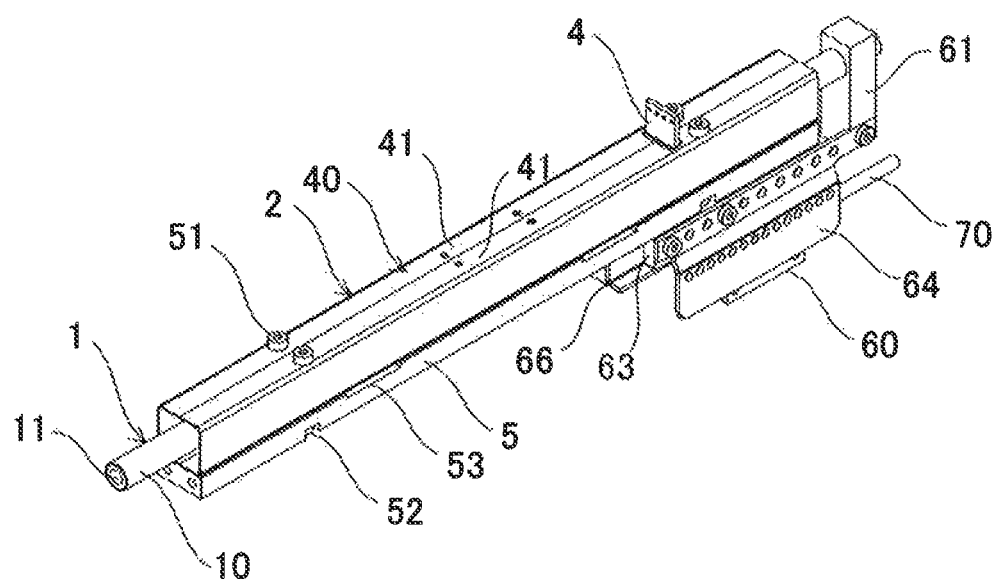
FIG. 1 is a perspective view showing a linear motor according to a first embodiment.

Referring first to FIGS. 1 through 9, the configuration of the linear motor according to the first embodiment will be described. FIG. 1 is a perspective view showing the linear motor according to the first embodiment. FIG. 2A is a vertical cross-sectional view showing the linear motor according to the first embodiment. FIG. 2B is a top view showing the linear motor according to the first embodiment. FIG. 2C is a bottom view showing the linear motor according to the first embodiment. FIG. 2D is a side view showing the distal side of the linear motor according to the first embodiment. FIG. 2E is a side view showing the proximal side of the linear motor according to the first embodiment.

As shown in FIG. 1, the linear motor 100 according to the first embodiment includes an excitation unit 1, an armature 2, a circuit board 4, and a frame 5.

Figure 2A:
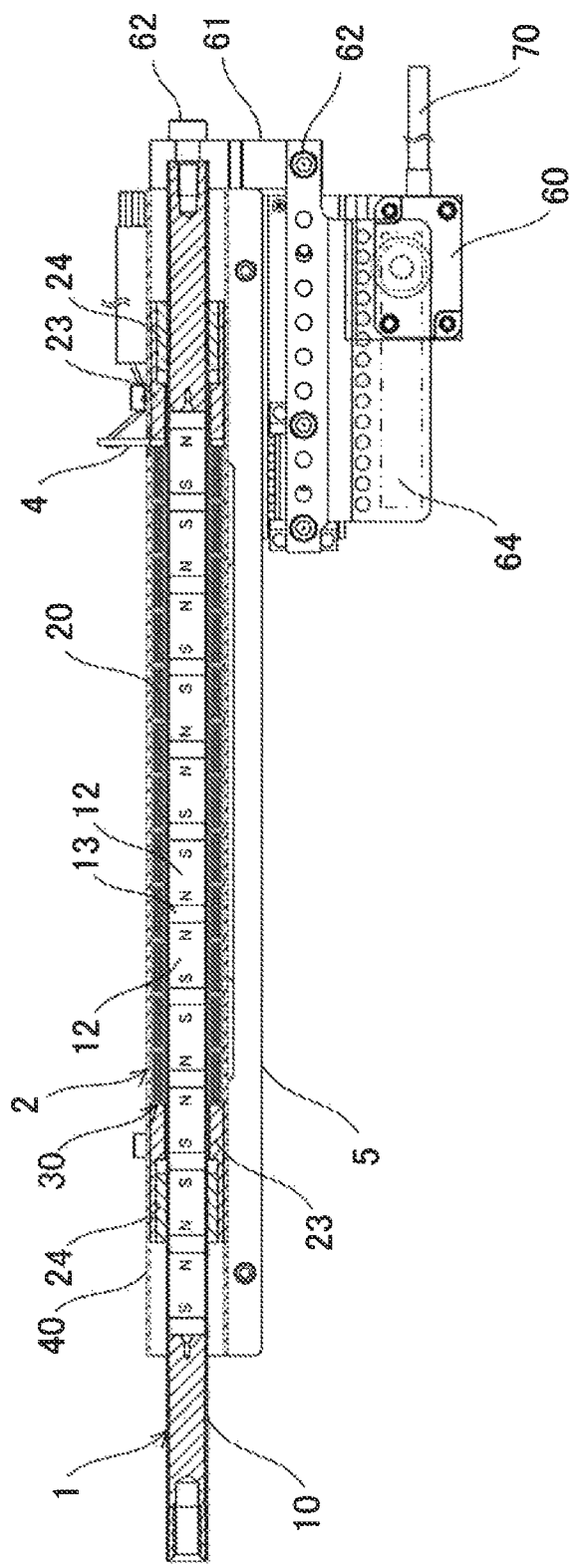
FIG. 2A is a vertical cross-sectional view showing the linear motor according to the first embodiment.

The excitation unit 1 includes a shaft 10 and a plurality of permanent magnets 12, as shown in FIG. 1 and FIG. 2A.

In this embodiment, the excitation unit 1 serves as a movable element. In the description given hereafter, the side to which the shaft 10 sticks out will be referred to as distal side, and the side to which the shaft 10 retreats will be referred to as proximal side.

The shaft 10 is a metal member of a circular cylindrical shape and includes a hollow portion 11. Examples of the material of the shaft 10 include, but are not limited to, a non-magnetic material such as austenitic stainless steel.

In the hollow portion 11 of the shaft 10, the permanent magnets 12 of a column shape are serially aligned in the axial direction of the shaft 10 (hereinafter, simply "axial direction"). In this embodiment, the permanent magnets 12 are magnetized such that the poles of the same polarity oppose each other (N-N, S-S) in the axial direction. A column-shaped soft magnetic material 13 is interposed between each pair of the permanent magnets 12, 12 to facilitate the permanent magnets 12 to be disposed with the same poles opposed to each other, however the soft magnetic material 13 may be excluded.

The armature 2 includes a plurality of coils 20 and a magnetic cover 40 of a rectangular tubular shape that covers the coils 20. In this embodiment, the armature 2 serves as a stator (linear guide).

The periphery of the shaft 10 (movable element) including therein the permanent magnets 12 is covered with the plurality of coils 20 serially aligned in the axial direction. The coils 20 are each wound in a circular cylindrical shape on an insulative bobbin 30.

Figure 3A:
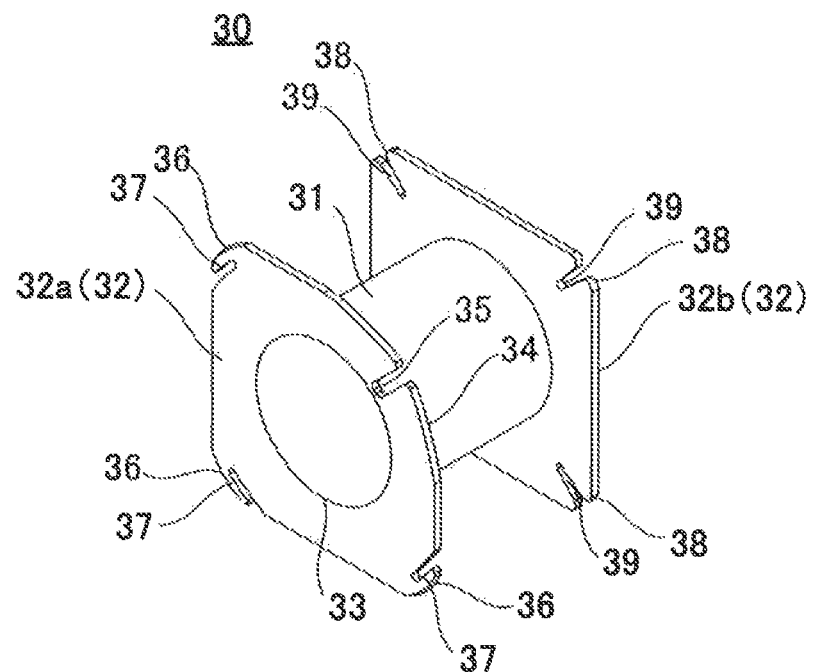
FIG. 3A is a perspective view showing a bobbin according to the first embodiment.
Figure 3B:
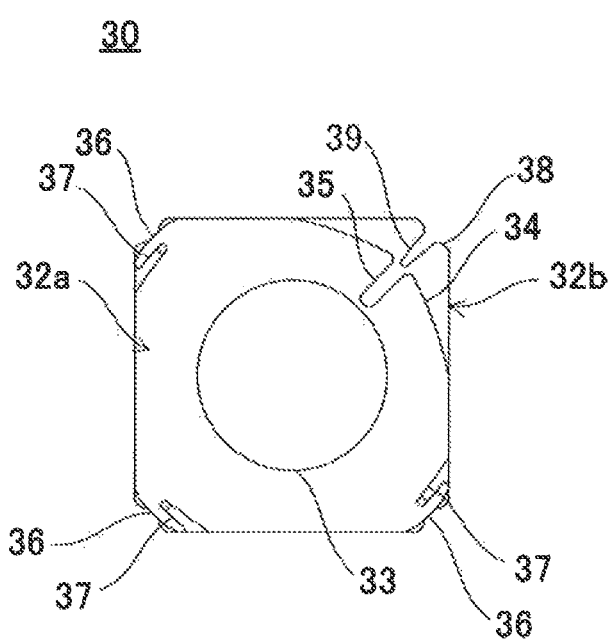
FIG. 3B is a side view showing the distal side of the bobbin according to the first embodiment.
Figure 3C:
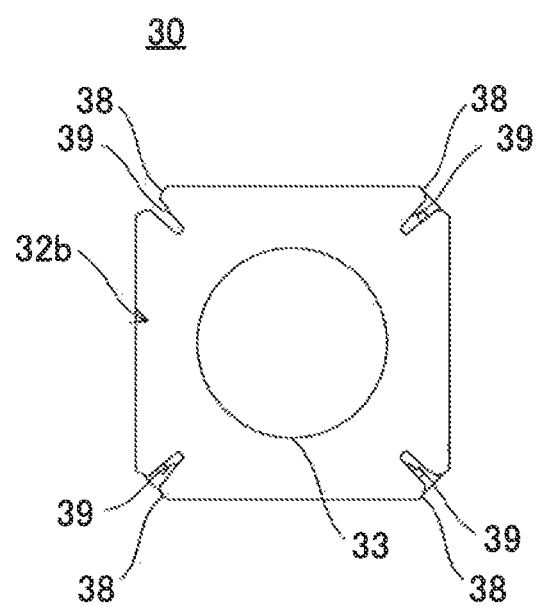
FIG. 3C is a side view showing the proximal side of the bobbin according to the first embodiment.

Referring now to FIGS. 3A to 3C, the specific configuration of the bobbin 30 according to the first embodiment will be described. FIG. 3A is a perspective view showing the bobbin according to the first embodiment. FIG. 3B is a side view showing the distal side of the bobbin according to the first embodiment. FIG. 3C is a side view showing the proximal side of the bobbin according to the first embodiment.

As shown in FIGS. 3A to 3C, the bobbin 30 includes a column portion 31 and flange portions 32 integrally formed on the respective end portions of the column portion 31.

The column portion 31 serves as a core on which the coil 20 is wound. In this embodiment, the column portion 31 has a circular cylindrical shape.

The flange portion 32 delimits the winding width of the coil 20, and also serves as an insulating spacer between the coils 20, 20. In this embodiment, the flange portion 32 is a generally rectangular plate-shaped member, including a circular opening 33 formed in a central portion and having an outer shape that can make contact with the inner surface of the magnetic cover 40 to be subsequently referred to. A distal side flange portion 32a and a proximal side flange portion 32b are different in shape from each other.

The distal side flange portion 32a has, as shown in FIGS. 3A and 3B, one of the four corners of the rectangular plate-shaped member processed in a curved shape so to form a rounded portion 34 which is narrower toward the circular opening 33 than the remaining three corners. The rounded portion 34 includes an inlet groove 35 recessed toward the central portion for introducing an insulated shielded wire to be wound on the bobbin 30. The inlet groove 35 is used to introduce the initial portion of the insulated shielded wire 21 to be wound on the bobbin 30 (see FIG. 4), and hence deeply formed so as to reach the vicinity of the circumferential surface of the column portion 31.

The remaining three corner portions are each chamfered so as to form a chamfered portion 36. In the vicinity of each of the chamfered portions 36, a support groove 37 is formed in a generally circumferential direction along the chamfered portion 36, from the side constituting the corner portion. The support groove 37 extends, in a side view, so as to reach an outlet groove 39 to be subsequently referred to.

The proximal side flange portion 32b has, as shown in FIGS. 3A and 3C, the four corners of the rectangular plate-shaped member chamfered. The chamfered portions 38 each include an outlet groove 39 recessed toward the central portion. The outlet groove 39 is used to draw out the winding end of the insulated shielded wire 21 wound on the bobbin 30, and serves to support a jumper wire 22 passing over the bobbin 30 (see FIG. 4). Accordingly, the outlet groove 39 of the proximal side flange portion 32b is shallower than the inlet groove 35 of the distal side flange portion 32a.

Examples of the material of the bobbin 30 include, but are not limited to, a synthetic resin such as phenol, nylon, and PBT.

Figure 4:
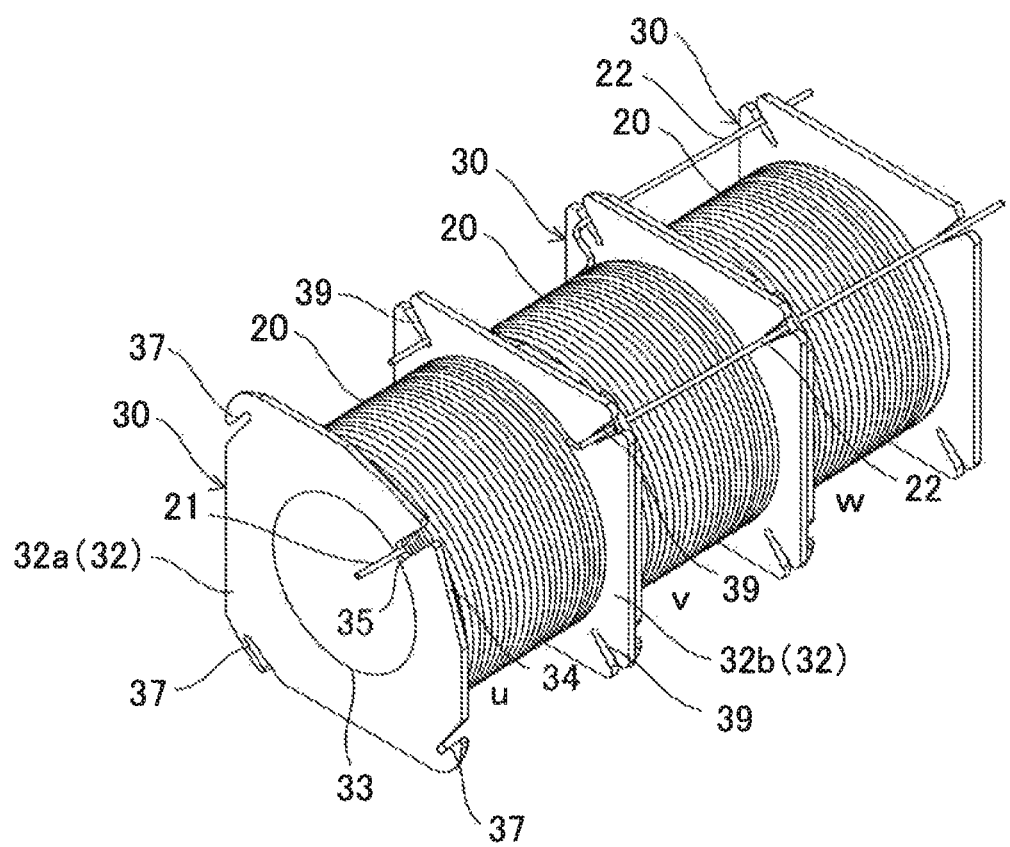
FIG. 4 is a fragmentary perspective view showing the bobbin according to the first embodiment, with a coil wound thereon.
Figure 5:
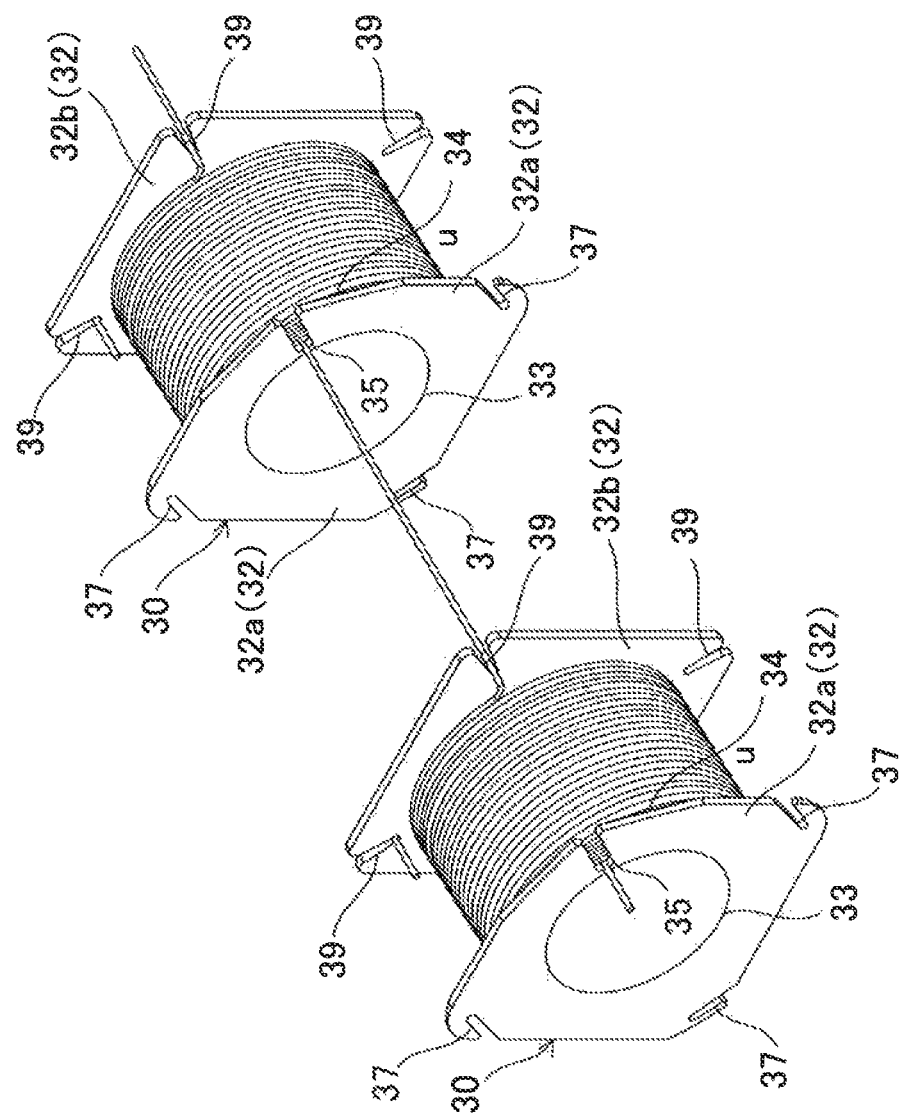
FIG. 5 is a fragmentary perspective view showing the bobbin according to the first embodiment, on which the coil of the same phase is continuously wound.

FIG. 4 is a fragmentary perspective view showing the bobbin according to the first embodiment, with a coil wound thereon. FIG. 5 is a fragmentary perspective view showing the bobbin according to the first embodiment, on which the coil of the same phase is continuously wound.

As shown in FIG. 2A and FIG. 4, the plurality of bobbins 30 are serially aligned in the axial direction, with the proximal side flange portion 32b of the bobbin 30 and the distal side flange portion 32a of the adjacent bobbin 30 made to abut each other. In the case where the power source is three-phase AC for example, the coils 20 are disposed in the order of u-phase, v-phase, and w-phase in the axial direction.

The coils 20 of the same phase group are continuously wound. In the case where the power source is three-phase AC as in this embodiment, the respective coils 20 of the u-phase group, the v-phase group, and the w-phase group are continuously wound over the plurality of bobbins 30. In other words, as shown in FIG. 4 and FIG. 5, the respective coils 20 of the u-phase group, the v-phase group, and the w-phase group are continuously wound on every third bobbin 30. Here, the illustrated positions of the u-phase, the v-phase, and the w-phase on the bobbins 30 are merely exemplary.

The portion of the insulated shielded wire 21 corresponding to the beginning of the coil 20 is introduced to the circumferential surface of the column portion 31 of the bobbin 30, through the inlet groove 35 of the distal side flange portion 32a. The insulated shielded wire 21 is wound around the column portion 31 of the bobbin 30 thus to form the coil 20. The winding end of the coil 20 is led out through the outlet groove 39 of the proximal side flange portion 32b. The portion of the insulated shielded wire 21 thus led out forms the jumper wire 22 supported by the mentioned outlet groove 39 and the support groove 37 of the distal side flange portion 32a, until reaching the next bobbin 30 on which the coil 20 of the same phase is to be wound.

Referring to FIG. 2A, bush holders 23 of a circular cylindrical shape are provided on the respective end portions of the plurality of groups of the coils 20. The bush holders 23 each include therein a guide bush 24 for the shaft 10. Here, the guide bush 24 may be provided inside the magnetic cover 40 in direct contact therewith.

Figure 6A:
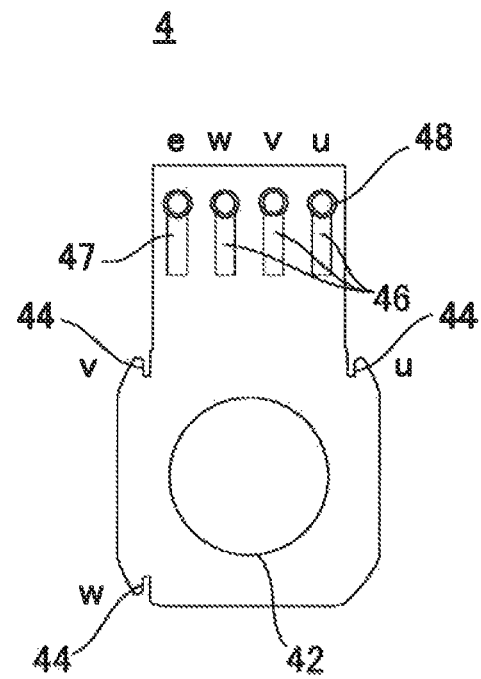
FIG. 6A is a front view showing a printed circuit board according to the first embodiment.
Figure 6B:
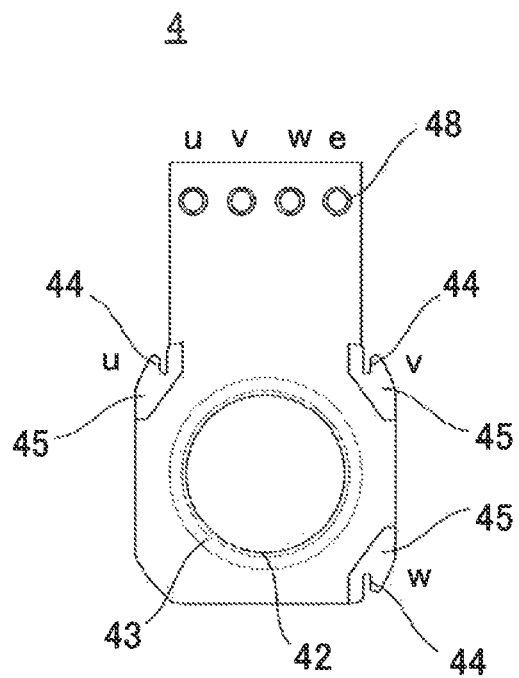
FIG. 6B is a rear view showing the printed circuit board according to the first embodiment.

FIG. 6A is a front view showing the printed circuit board according to the first embodiment. FIG. 6B is a rear view showing the printed circuit board according to the first embodiment.

As shown in FIGS. 6A and 6B, the printed circuit board 4 is a plate-shaped member taller than wide, and includes a printed circuit formed thereon. The lower half region of the printed circuit board 4 is formed in a shape similar to that of the proximal side flange portion 32 of the bobbin 30. The printed circuit board 4 includes a circular opening 42 formed in a central portion of the lower half region. The printed circuit board 4 also includes a land 43 for the ground wire, formed on the rear face of the printed circuit board 4 around the circular opening 42.

The printed circuit board 4 includes holding grooves 44 respectively formed at three of the four corners of the lower half region and extending in the vertical direction, and lands 45 formed on the rear face of the printed circuit board 4 around the respective holding grooves 44. The end portions of the insulated shielded wire 21 of the u-phase, the v-phase, and the w-phase are supported by the respective holding grooves 44 and connected to the land 45 by soldering.

Lands 46 for the respective leads of the u-phase, the v-phase, and the w-phase, and a land 47 for the ground wire are provided on the front face of the upper half region of the printed circuit board 4. A through hole 48 is formed at the end portion of each of the lands 46, 47. The leads and the ground wire are routed through the through hole 48 from the rear side and connected to the lands 46, 47 by soldering on the front side.

On the printed circuit board 4, the lands 45 on the rear face and the lands 46 for the leads on the front face are respectively wire-connected to each other, with respect to the u-phase, the v-phase, and the w-phase. The land 43 for the ground wire on the rear face and the land 47 for the ground wire on the front face are wire-connected to each other. Here, the illustrated positions of the u-phase, the v-phase, and the w-phase on the printed circuit board 4 are merely exemplary.

As shown in FIG. 2A, the printed circuit board 4 is erected perpendicular to the axial direction between the bobbin of the coil 20 of the most proximal position and the bush holder 23.

Figure 7:
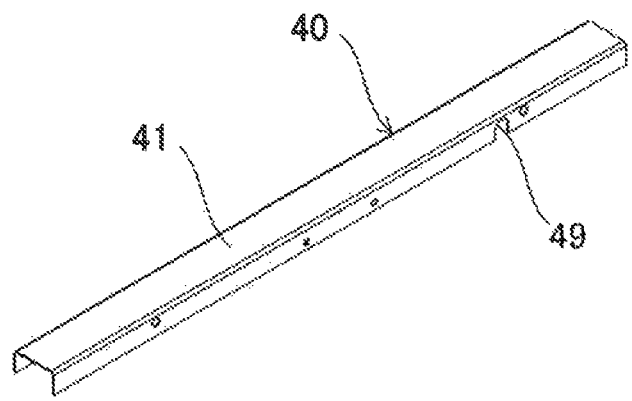
FIG. 7 is a perspective view showing a magnetic cover according to the first embodiment.

FIG. 7 is a perspective view showing the magnetic cover according to the first embodiment.

Figure 2B:
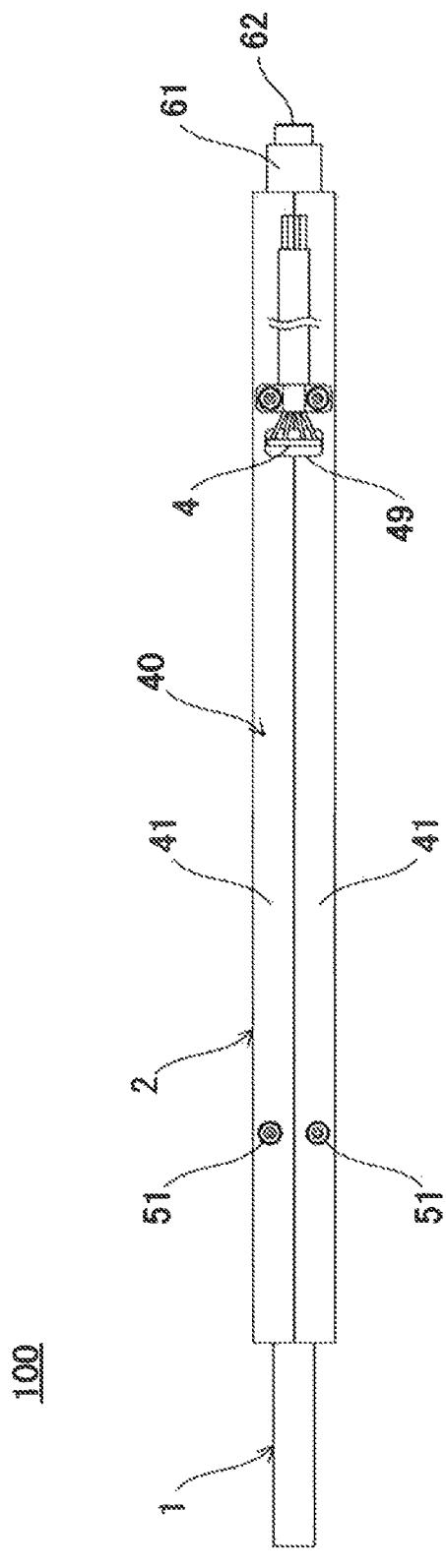
FIG. 2B is a top view showing the linear motor according to the first embodiment.
Figure 2D:
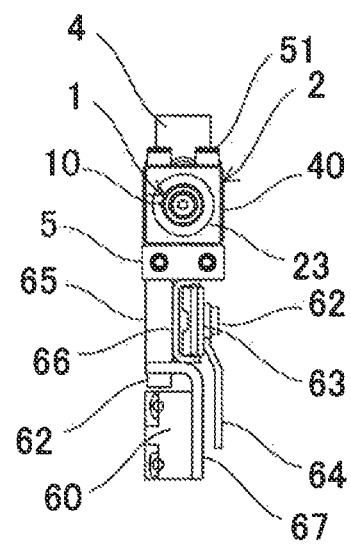
FIG. 2D is a side view showing the distal side of the linear motor according to the first embodiment.
Figure 2E:
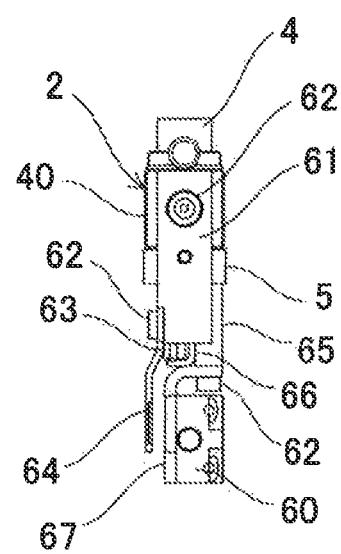
FIG. 2E is a side view showing the proximal side of the linear motor according to the first embodiment.

As shown in FIG. 1, FIG. 2B and FIG. 7, the magnetic cover 40 is a magnetic metal member of a rectangular tubular shape. The magnetic cover 40 is composed of a pair of channel-shaped cover pieces 41, 41 combined in a rectangular tubular shape. The magnetic cover 40 encloses the plurality of groups of coils 20.

The magnetic cover 40 is longer than the total length of the block of the permanent magnets 12 in the shaft 10 located inside of the coils 20. The cover pieces 41, 41 each include a cutaway portion 49 formed at a predetermined portion on the proximal side so as to insert the printed circuit board 4 in the erected position.

The magnetic cover 40 serves to lock up thereinside the majority of the magnetic flux of the permanent magnets 12 in the shaft 10, to thereby suppress leakage of the flux. Both end portions of the magnetic cover 40 in the axial direction are open, and hence sufficient ventilation is secured and the coils 20 can be suppressed from heating up.

The magnetic cover 40 may be formed of, for example, an iron-based magnetic material such as an SC material. It is preferable to employ a silicon steel formed by sheeting or stamping, to achieve both a low cost and high performance.

Figure 8:
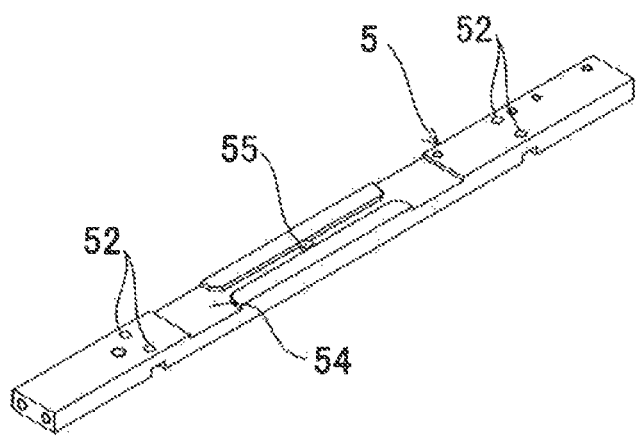
FIG. 8 is a perspective view showing a frame according to the first embodiment.
Figure 9:
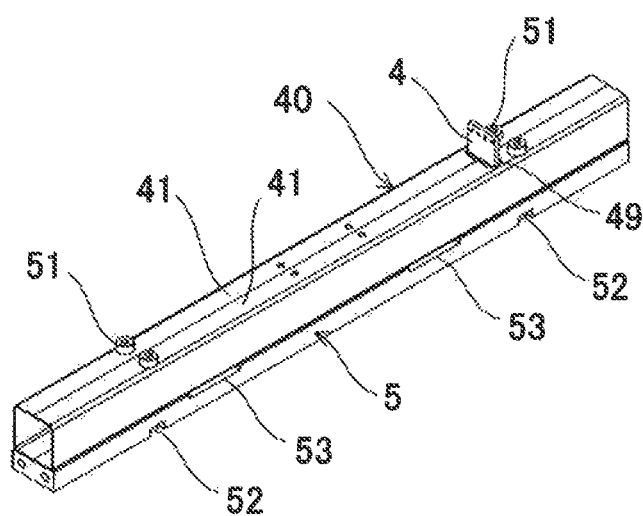
FIG. 9 is a perspective view showing the frame and the magnetic cover fixed thereon, according to the first embodiment.

FIG. 8 is a perspective view showing a frame according to the first embodiment. FIG. 9 is a perspective view showing the frame and the magnetic cover fixed thereon, according to the first embodiment.

As shown in FIG. 1, FIGS. 2A and 2C, and FIG. 8, the frame 5 is a rectangular plate-shaped member on which the excitation unit 1 and the armature 2 are mounted. The frame 5 includes a through hole 52 for a bolt 51 to be passed therethrough. As shown in FIG. 1 and FIG. 9, the magnetic cover 40 is fixed to the frame 5 upon passing the bolt 51 through the through hole 52 of the frame 5 and fastening the bolt 51 to the female thread of a linear bush holder 24. Thus, the armature 2 is mounted on the frame 5, and the excitation unit 1 is accommodated in the armature 2.

The frame 5 includes a recessed portion 54 formed on the surface thereof, so as to define a slot 53 with the magnetic cover 40 and form a T-shaped cooling path. A ventilation hole 55 is formed in a central portion of the recessed portion 54. The ventilation hole 55 is female-threaded, so that a non-illustrated cooling pipe can be connected. Cooling air flows through the ventilation hole 55 into the recessed portion 54 where the cooling path is provided, and flows out through the slot 53. Forming thus the cooling path between the frame 5 and the magnetic cover 40 encourages the heat dissipation of the coils 20.

Examples of the material of the frame 5 include, but are not limited to aluminum or an aluminum-based alloy, because of high processability. The frame 5 can be easily formed, for example, by a plastic processing such as stamping.

As shown in FIG. 1, FIGS. 2A, 2C, 2D, and FIG. 2E, the proximal end portion of the shaft 10 is fixed to a vertically erected square column-shaped block member 61 via a bolt 62. A moving element 63, which moves together with the block member 61 along a guide rail 66 to be subsequently referred to, is fixed to the block member 61 at a position in the lower portion on the side of the frame 5.

Between the lower portion of a lateral side of the block member 61 and the distal end portion of the moving element 63, a gauge 64 for measurement with the linear sensor 60 to be subsequently referred to is fixed with a bolt 62.

To a lower portion of the proximal side of the frame 5, a plate-shaped suspension member 65 is fixed at a position biased to the other lateral face. The channel-shaped guide rail 66 is fixed to the inner face of the suspension member 65. The moving element 63 is set to slide along the guide rail 66.

Further, a support member 67 having a reverse L-shaped cross-sectional shape is fixed to a lower portion of the suspension member 65 with the bolt 62. The support member 67 includes the linear sensor 60 that detects the position of the gauge 64 and outputs position information. As shown in FIG. 2A, an output line 70 for outputting detection data is connected to the linear sensor 60.

The linear sensor 60 is located away from the armature 2 including the coils 20, to be exempted from the impact of magnetism and heat. The linear sensor 60 may be either a magnetic or an optical sensor.

[Operation of Linear Motor]

Referring now to FIG. 1, FIG. 2A, and FIG. 3A through FIG. 6B, the operation of the linear motor 100 according to the first embodiment will be described.

As shown in FIG. 1 and FIG. 2A, the excitation unit 1 of the linear motor 100 according to the first embodiment includes the plurality of permanent magnets 12 in the hollow portion 11 of the shaft 10, the permanent magnets 12 being aligned in the axial direction such that the same poles are opposed to each other (N-N, S-S). The armature 2 is disposed so as to enclose the shaft 10 including the permanent magnets 12, and includes the plurality of coils 20 aligned in the axial direction. The coils 20 are arranged so as to correspond, for example, to the u-phase, the v-phase, and the w-phase of a three-phase power source, so that current is supplied in shifted phases to the respective coils 20 of the u-phase, the v-phase, and the w-phase.

In the first embodiment, the excitation unit 1 serves as a movable element, and the armature 2 serves as a stator. In the linear motor 100 according to this embodiment the current runs on the coil 20 of the armature 2 so as to intersect the magnetic flux generated by the permanent magnet 12 of the excitation unit 1. When the magnetic flux of the permanent magnet and the current running on the coil 20 of the armature 2 intersect with each other, the linear motor 100 according to this embodiment causes the shaft 10 including the permanent magnets 12 to generate a thrust force in the axial direction by electromagnetic induction, thereby causing the shaft 10 to linearly move.

In the linear motor 100 according to the first embodiment, the coil 20 is wound around the bobbin 30 having a special shape. The bobbin 30 includes a column portion 31 and a pair of flange portions 32 integrally formed on the respective end portions of the column portion 31, and the flange portions 32 are formed in distinctive shapes.

As shown in FIGS. 3A and 3B and FIG. 4, the distal side flange portion 32a includes the inlet groove 35 formed in the rounded portion 34 for introducing the insulated shielded wire to be wound around the bobbin 30. The inlet groove 35 extends so as to reach the vicinity of the circumferential surface of the column portion 31, and is used to introduce the initial portion of the insulated shielded wire 21 to be wound around the bobbin 30. The distal side flange portion 32a also includes the support groove 37 formed in the vicinity of each of the chamfered portions 36.

As shown in FIGS. 3A and 3C, the proximal side flange portion 32b includes the outlet groove 39 formed in each of the chamfered portions 38. The outlet groove 39 is used to draw out the end portion of the insulated shielded wire 21 wound around the bobbin 30, and to support the jumper wire 22 spanned over the bobbin 30.

Thus, the portion of the insulated shielded wire 21 corresponding to the beginning of the coil 20 is introduced to the circumferential surface of the column portion 31 of the bobbin 30 through the inlet groove 35 of the distal side flange portion 32a, and wound around the column portion 31 to form the coil 20. The winding end of the coil 20 is led out through the outlet groove 39 of the proximal side flange portion 32b.

In the case where the power source is three-phase AC, the plurality of coils 20 of each of the u-phase group, the v-phase group, and the w-phase group are continuously wound over the plurality of bobbins 30. As shown in FIG. 4 and FIG. 5, the coils 20 of each of the u-phase group, the v-phase group, and the w-phase group are continuously wound around every third bobbin 30.

Accordingly, the insulated shielded wire 21 led out from the outlet groove 39 of the proximal side flange portion 32b is supported as the jumper wire 22 by the same outlet groove 39 and the support groove 37 of the distal side flange portion 32a, before reaching the bobbin 30 for the next coil 20 of the same phase.

The end portion of the insulated shielded wire 21 of each of the u-phase, the v-phase, and the w-phase is retained by the holding groove 44 of the printed circuit board 4 and connected by soldering to the land 45 on the rear face of the printed circuit board 4.

Referring to FIGS. 6A and 6B, the lands 45 on the rear face of the printed circuit board 4 and the lands 46 for the lead on the front face thereof are respectively wire-connected to each other, with respect to the u-phase, the v-phase, and the w-phase. In addition, the land 43 for the ground wire on the rear face and the land 47 for the ground wire on the front face are wire-connected to each other.

The printed circuit board 4 is, as shown in FIG. 2A, erected perpendicular to the axial direction between the coil 20 of the most proximal position and the bush holder 23.

In the linear motor 100 according to the first embodiment, the plurality of coils 20 of the u-phase group, the v-phase group, and the w-phase group are continuously wound over the plurality of bobbins 30. Therefore, the wiring work of the jumper wire 22 between the coils 20, 20 can be minimized (for three wires in this embodiment). In addition, only the end portion of the insulated shielded wire of each of the u-phase, the v-phase, and the w-phase is connected to the printed circuit board 4. Therefore, the number of connection points to the circuit board 4 is reduced, which leads to improved wiring work efficiency of the lead of each phase and the ground wire.

The end portion of the insulated shielded wire 21 of each of the u-phase, the v-phase, and the w-phase is connected to the printed circuit board 4 by soldering. The printed circuit board 4 is erected perpendicular to the axial direction between the coil 20 of the most proximal position and the bush holder 23. The printed circuit board 4 is inserted through the cutaway portion 49 of the magnetic cover 40 and protrudes therefrom. Further, the leads of the respective phases and the ground wire can be easily and securely connected by appropriately arranging the wiring pattern on the printed circuit board 4.

Since the printed circuit board 4 is erected upright with respect to the axial direction, the width of the armature 2 is kept from increasing. Although the four corners inside of the magnetic cover 40 of the rectangular tubular shape are normally dead spaces, the respective jumper wires 22 of the u-phase, the v-phase, and the w-phase and the ground wire are routed through the inner four corners. Such effective utilization of the space in the armature 2 enables reduction in size of the armature 2.

The distinctive configuration of the flange portions 32 of the bobbin 30 enables the coils 20 to be continuously wound, and also allows the jumper wires 22 of the respective coils 20 to be securely fixed and protected.

Consequently, the linear motor 100 according to the first embodiment can improve the wiring work efficiency for arranging the lead of each phase and the ground wire, and enables reduction in size of the armature 2.

In addition, the armature 2 encloses therein the excitation unit 1 constituted of the shaft 10 including the permanent magnets 12. The armature 2 accommodates the plurality of groups of coils 20 inside the magnetic cover 40.

The magnetic cover 40, constituted of a magnetic material in a rectangular tubular shape, can be easily formed from silicon steel by sheeting or stamping. Likewise, the frame 5 can be easily formed, for example, by stamping. Therefore, the linear motor 100 according to this embodiment achieves both low cost and high performance.

Further, the magnetic cover 40 locks up thereinside the majority of the magnetic flux of the permanent magnets 12 to thereby suppress leakage of the flux. Such a configuration eliminates the need to provide a magnetism shielding plate, and contributes to reducing the size, footprint, and weight.

The shaft 10 including the permanent magnets 12 is surrounded by the groups of the ring-shaped coils 20. The groups of coils 20 are accommodated in the magnetic cover 40. Therefore, in the linear motor 100 according to the first embodiment the magnetic cover 40 locks up thereinside the majority of the magnetic flux of the permanent magnets 12 to thereby suppress leakage of the flux.

Further, the frame 5 includes the recessed portion 54 formed on the upper face so as to define the slot 53 between the frame 5 and the magnetic cover 40, and the slot 53 serves as the cooling path. The recessed portion 54 of the frame 5 includes the ventilation hole 55. Such a configuration allows cooling air to be introduced into the cooling path formed by the slot 53 through the ventilation hole 55, thus enabling the armature 2 including the coils 20 to be cooled. Therefore, the linear motor 100 according to this embodiment exhibits excellent heat dissipation performance.

In addition, the linear motor 100 according to this embodiment includes the linear sensor 60 which is exclusive thereto, and therefore can be employed as a monoaxial actuator. Further, a polyaxial actuator can be obtained by combining a plurality of linear motors 100 according to this embodiment.

The linear motor 100 cant thus be easily utilized as a monoaxial or a polyaxial actuator, and therefore flexibility in designing a head of a chip mounter can be secured.

[Second Embodiment]

Figure 10A:
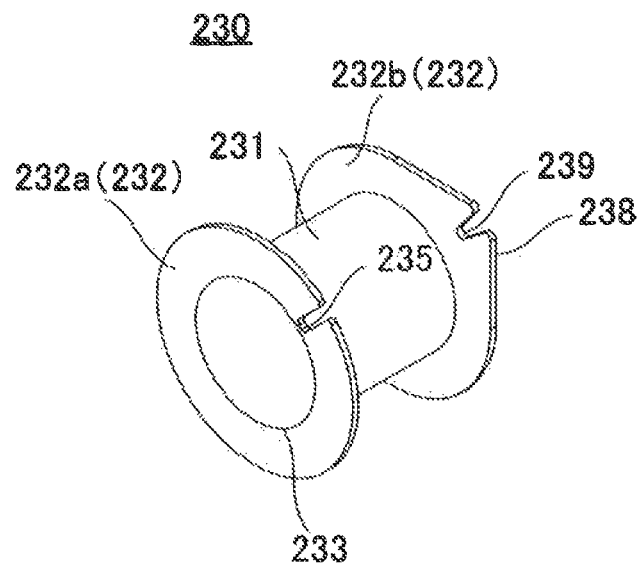
FIG. 10A is a perspective view showing a bobbin according to a second embodiment.
Figure 10B:
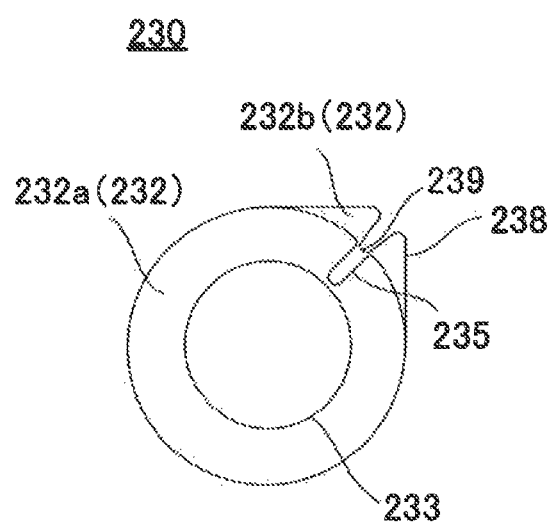
FIG. 10B is a side view showing the distal side of the bobbin according to the second embodiment.
Figure 10C:
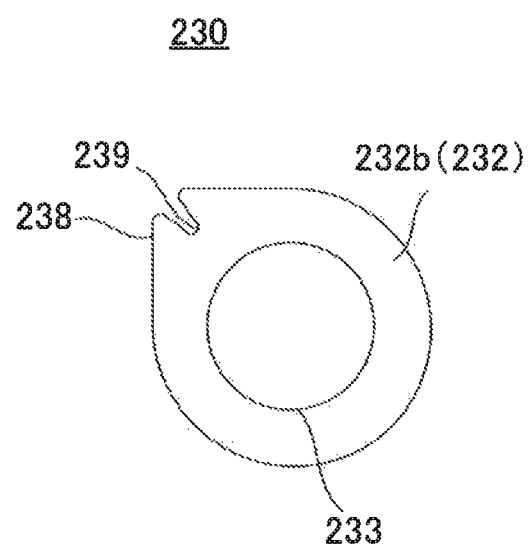
FIG. 10C is a side view showing the proximal side of the bobbin according to the second embodiment.

Referring now to FIGS. 10A to 10C, a linear motor according to a second embodiment will be described. FIG. 10A is a perspective view showing a bobbin according to the second embodiment. FIG. 10B is a side view showing the distal side of the bobbin according to the second embodiment. FIG. 10C is a side view showing the proximal side of the bobbin according to the second embodiment.

As shown in FIGS. 10A to 10C, the linear motor according to the second embodiment is configured similarly to the first embodiment, except for the structure of a bobbin 230 around which the coil is to be wound.

More specifically, the linear motor according to the second embodiment is different from the first embodiment in the shape of flange portions 232 of the bobbin 230. A distal side flange portion 232a and a proximal side flange portion 232b are different in shape from each other.

The distal side flange portion 232a is an annular plate-shaped member including a circular opening 233 formed in the central portion, as shown in FIGS. 10A and 10B. The distal side flange portion 232a includes an inlet groove 235 recessed toward the center thereof for introducing the insulated shielded wire to be wound around the bobbin 230, at a position corresponding to one of the four corners inside of the magnetic cover. The inlet groove 235 is used to introduce the initial portion of the insulated shielded wire to be wound around the bobbin 230, and hence deeply formed so as to reach the vicinity of the circumferential surface of the column portion 231.

The proximal side flange portion 232b is an annular plate-shaped member including a protruding portion 238 formed in a part of the circumference of the annular shape, and includes the circular opening 233 formed in the central portion, as shown in FIGS. 10A and 10C. The protruding portion 238 is formed in a shape that can make contact with one of the four corners inside of the magnetic cover. The protruding portion 238 includes an outlet groove 239 recessed toward the center of the proximal side flange portion 232b. The outlet groove 239 is used to draw out the winding end of the insulated shielded wire wound on the bobbin 230. Accordingly, the outlet groove 239 of the proximal side flange portion 232b is shallower than the inlet groove 235 of the distal side flange portion 232a.

The bobbins 230 according to the second embodiment are set to different angular orientations with respect to the four corners inside of the magnetic cover, depending on which of the u-phase group, the v-phase group, and the w-phase group the bobbin 230 corresponds to. In other words, the inlet groove 235 and the outlet groove 239 of the bobbin 230 according to the second embodiment are located at different angular positions, depending on which of the u-phase group, the v-phase group, and the w-phase group the bobbin 230 corresponds to.

A plurality of bobbins 230 are serially aligned in the axial direction, with the proximal side flange portion 232b of the bobbin 230 and the distal side flange portion 232a of the adjacent bobbin 230 made to abut each other. In the case where the power source is three-phase AC for example, the bobbins 230 are disposed in the order of u-phase, v-phase, and w-phase in the axial direction.

The coils of the same phase group are continuously wound. In the case where the power source is three-phase AC as in this embodiment, the respective coils of the u-phase group, the v-phase group, and the w-phase group are continuously wound over the plurality of bobbins 230. In other words, the respective coils of the u-phase group, the v-phase group, and the w-phase group are continuously wound on every third bobbin 230.

The initial portion of the insulated shielded wire to be wound around the bobbin 230 is introduced to the circumferential surface of the column portion 231 of the bobbin 230, through the inlet groove 235 of the distal side flange portion 232a, and wound around the column portion 231 to form the coil. The winding end of the coil is led out through the outlet groove 239 of the proximal side flange portion 232b, and passed through the corner portion in the magnetic cover so as to form the jumper wire, until reaching the next bobbin 230 on which the coil of the same phase is to be wound.

The linear motor according to the second embodiment provides, basically, the same advantageous effects as those provided by the first embodiment. In particular, the distal side flange portion 232a of the linear motor according to the second embodiment is an annular plate-shaped member, and the inlet groove 235 is located at a position corresponding to one of the four corners inside of the magnetic cover. The proximal side flange portion 232b includes the protruding portion 238 formed in a part of the circumference of the annular shape, and the protruding portion 238 includes the outlet groove 239. Thus, the linear motor according to the second embodiment provides a distinctive advantage in that the dead space at the four corners inside of the magnetic cover can be effectively utilized with the bobbin 230 having the extremely simple structure.

[Third Embodiment]

Figure 11A:
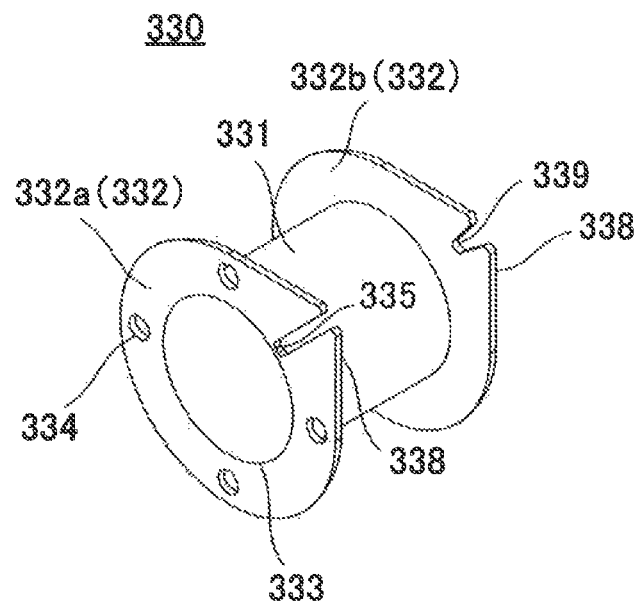
FIG. 11A is a perspective view showing a bobbin according to a third embodiment.
Figure 11B:
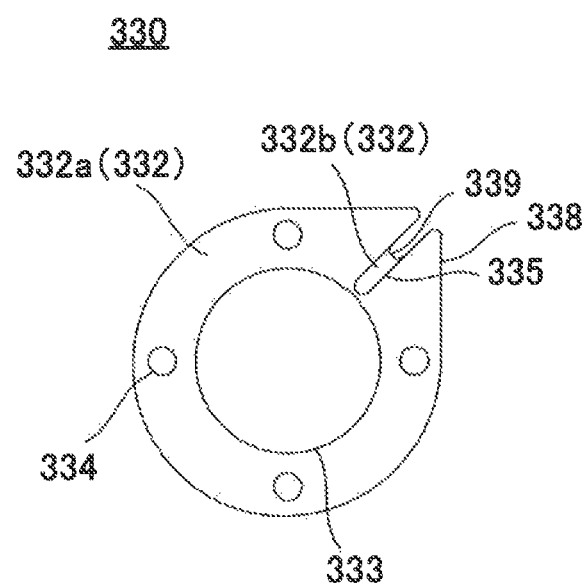
FIG. 11B is a side view showing the distal side of the bobbin according to the third embodiment.
Figure 11C:
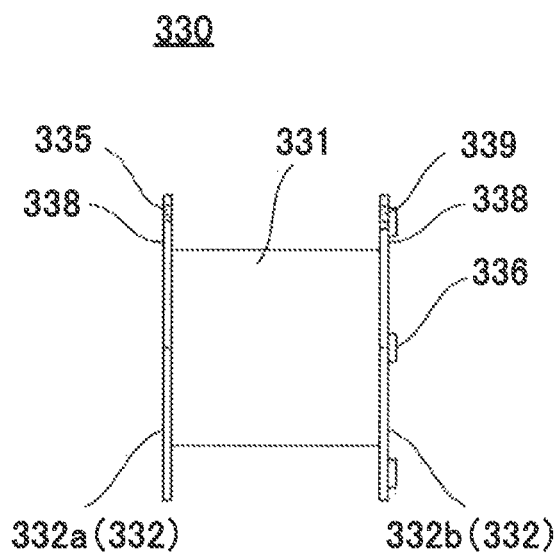
FIG. 11C is a side view showing the bobbin according to the third embodiment.
Figure 11D:
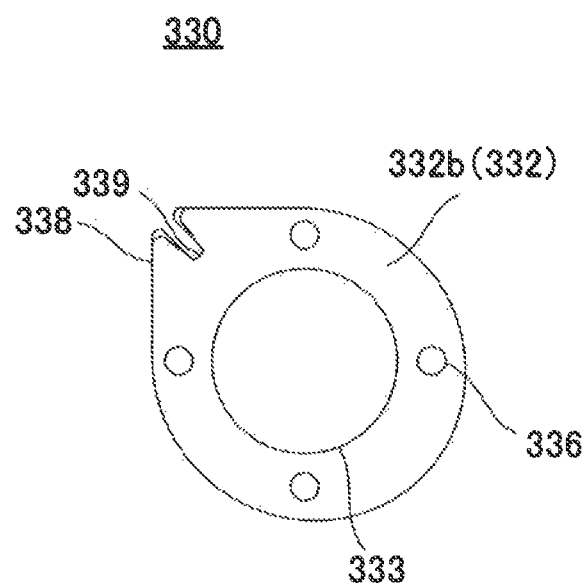
FIG. 11D is a side view showing the proximal side of the bobbin according to the third embodiment.

Referring now to FIGS. 11A to 11D, a linear motor according to a third embodiment will be described. FIG. 11A is a perspective view showing a bobbin according to the third embodiment. FIG. 11B is a side view showing the distal side of the bobbin according to the third embodiment. FIG. 11C is a side view showing the bobbin according to the third embodiment. FIG. 11D is a side view showing the proximal side of the bobbin according to the third embodiment.

As shown in FIGS. 11A to 11D, the linear motor according to the third embodiment is configured similarly to the first embodiment, except for the structure of a bobbin 330, which is a variation of the bobbin according to the second embodiment.

More specifically, the linear motor according to the third embodiment is different from the second embodiment in the configuration of flange portions 332 of the bobbin 330. A distal side flange portion 332a and a proximal side flange portion 332b have generally the same shape.

As shown in FIGS. 11A and 11B, the distal side flange portion 332a includes a protruding portion 338 formed in a part of the circumference of the annular shape, and a circular opening 333 formed in the central portion. The protruding portion 338 is formed in a shape that can make contact with one of the four corners inside of the magnetic cover. The protruding portion 338 includes an inlet groove 335 recessed toward the center of the distal side flange portion 332a. The inlet groove 335 is used to introduce the initial portion of the insulated shielded wire to be wound around the bobbin 330, and hence deeply formed so as to reach the vicinity of the circumferential surface of the column portion 331.

The proximal side flange portion 332b includes, as shown in FIGS. 11A and 11D, a protruding portion 338 formed in a part of the circumference of the annular shape, and the circular opening 333 formed in the central portion. The protruding portion 338 is formed in a shape that can make contact with one of the four corners inside of the magnetic cover. The protruding portion 338 includes an outlet groove 339 recessed toward the center of the proximal side flange portion 332b. The outlet groove 339 is used to draw out the winding end of the insulated shielded wire wound on the bobbin 330. Accordingly, the outlet groove 339 of the proximal side flange portion 332b is shallower than the inlet groove 335 of the distal side flange portion 332a.

The flange portions 332 each include an engaging device for connection of the bobbins 330. To be more detailed, the distal side flange portion 332a includes a plurality of engaging holes 334 formed on the surface on the distal side, as shown in FIGS. 11A to 11C. Although the engaging holes 334 according to this embodiment are through holes, recessed portions may be formed instead.

In this embodiment, four engaging holes 334 are circular openings provided at regular intervals in the circumferential direction. This is because the bobbins 330 are rotationally shifted from each other by 90 degrees, and therefore the shape and the number of engaging holes 334 are not specifically limited, provided that the bobbins 330 can be shifted from each other by 90 degrees to be placed at predetermined positions.

In contrast, as shown in FIGS. 11A, 11C, and 11D, the proximal side flange portion 332b includes a plurality of engaging projections 336 formed on the surface on the proximal side, so as to be inserted in the engaging holes 334. In this embodiment, four engaging projections 336 are of a circular shape and provided at regular intervals in the circumferential direction at positions corresponding to the respective engaging holes 334.

The bobbins 330 according to the third embodiment are set to different angular orientations with respect to the four corners inside of the magnetic cover, depending on which of the u-phase group, the v-phase group, and the w-phase group the bobbin 330 corresponds to. In other words, the inlet groove 335 and the outlet groove 339 of the bobbin 330 according to the third embodiment are located at different angular positions, depending on which of the u-phase group, the v-phase group, and the w-phase group the bobbin 330 corresponds to.

A plurality of bobbins 330 are serially aligned in the axial direction, with the proximal side flange portion 332b of the bobbin 330 and the distal side flange portion 332a of the adjacent bobbin 330 made to abut each other. At this point, the engaging projections 336 of the proximal side flange portion 332b are respectively engaged with the engaging holes 334 of the distal side flange portion 332a. In the case where the power source is three-phase AC for example, the coils are disposed in the order of u-phase, v-phase, and w-phase in the axial direction.

The coils of the same phase group are continuously wound. In the case where the power source is three-phase AC as in this embodiment, the respective coils of the u-phase group, the v-phase group, and the w-phase group are continuously wound over the plurality of bobbins 330. In other words, the respective coils of the u-phase group, the v-phase group, and the w-phase group are continuously wound on every third bobbin 330.

The initial portion of the insulated shielded wire to be wound around the bobbin 330 is introduced to the circumferential surface of the column portion 331 of the bobbin 330, through the inlet groove 335 of the distal side flange portion 332a, and wound around the column portion 331 to form the coil. The winding end of the coil is led out through the outlet groove 339 of the proximal side flange portion 332b, and passed through the corner portion in the magnetic cover so as to form the jumper wire, until reaching the next bobbin 330 on which the coil of the same phase is to be wound.

The linear motor according to the third embodiment provides, basically, the same advantageous effects as those provided by the second embodiment. In the linear motor according to the third embodiment, in particular, the engaging projections 336 of the proximal side flange portion 332b are respectively engaged with the engaging holes 334 of the distal side flange portion 332a, when serially aligning the bobbins 330. Thus, the linear motor according to the third embodiment provides a distinctive advantage in that the positioning and connection of the bobbins 330 can be easily and securely achieved, and the coil quality can be upgraded.

[Fourth Embodiment]

Figure 12A:
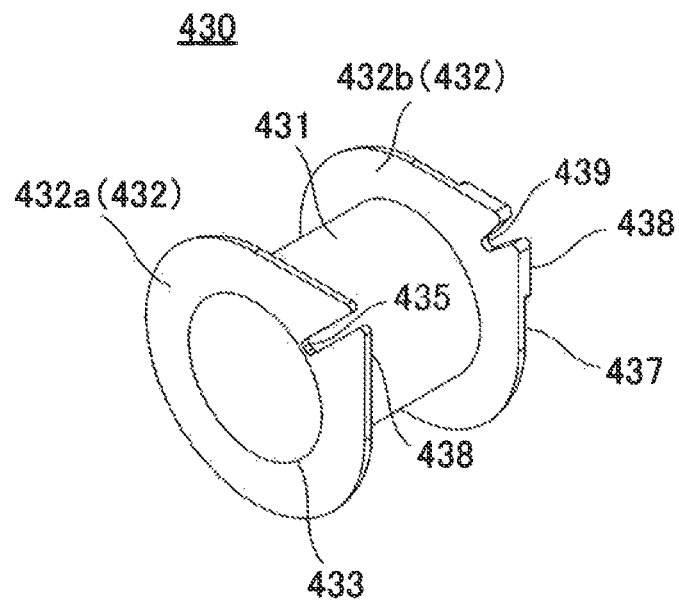
FIG. 12A is a perspective view showing a bobbin according to a fourth embodiment.
Figure 12B:
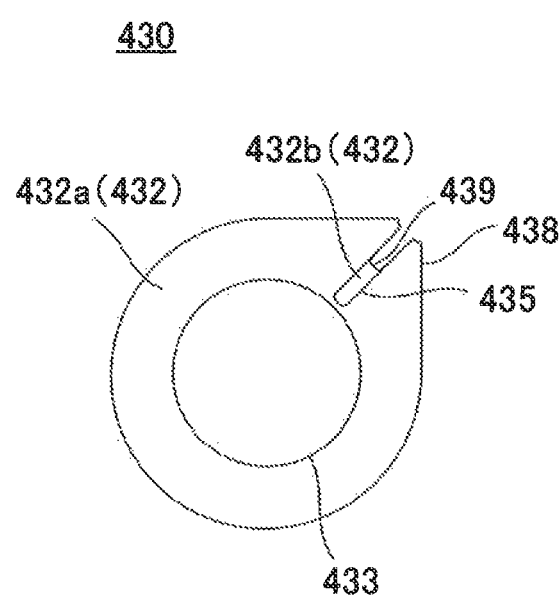
FIG. 12B is a side view showing the distal side of the bobbin according to the fourth embodiment.
Figure 12C:
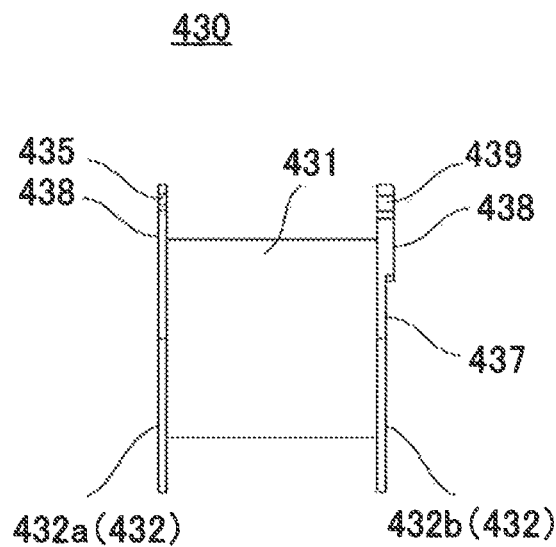
FIG. 12C is a side view showing the bobbin according to the fourth embodiment.
Figure 12D:
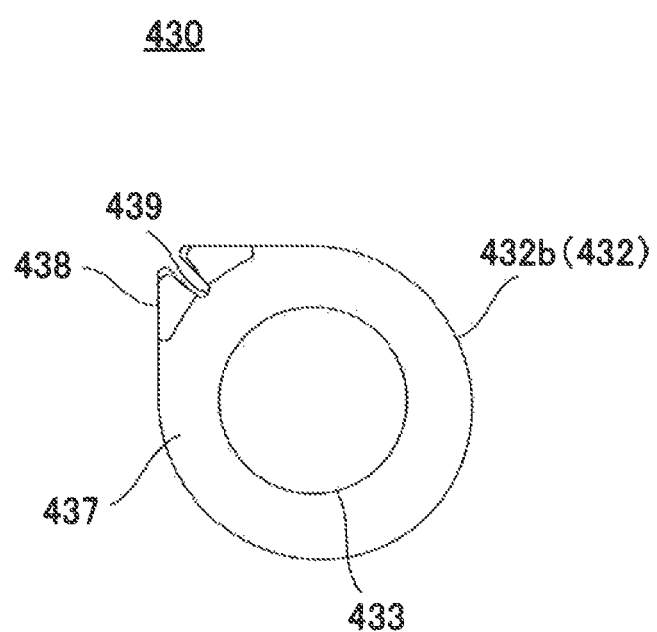
FIG. 12D is a side view showing the proximal side of the bobbin according to the fourth embodiment.

Referring now to FIGS. 12A to 12D, a linear motor according to a fourth embodiment will be described. FIG. 12A is a perspective view showing a bobbin according to the fourth embodiment. FIG. 12B is a side view showing the distal side of the bobbin according to the fourth embodiment. FIG. 12C is a side view showing the bobbin according to the fourth embodiment. FIG. 12D is a side view showing the proximal side of the bobbin according to the fourth embodiment.

As shown in FIGS. 12A to 12D, the linear motor according to the fourth embodiment is configured similarly to the first embodiment, except for the structure of a bobbin 430, which is a variation of the bobbin according to the second and third embodiments.

More specifically, the linear motor according to the fourth embodiment is different from the second and third embodiments in the configuration of flange portions 432 of the bobbin 430. A distal side flange portion 432a and a proximal side flange portion 432b have generally the same shape.

As shown in FIGS. 12A and 12B, the distal side flange portion 432a includes a protruding portion 438 formed in a part of the circumference of the annular shape, and a circular opening 433 formed in the central portion. The protruding portion 438 is formed in a shape that can make contact with one of the four corners inside of the magnetic cover. The protruding portion 438 includes an inlet groove 435 recessed toward the center of the distal side flange portion 432a. The inlet groove 435 is used to introduce the initial portion of the insulated shielded wire to be wound around the bobbin 430, and hence deeply formed so as to reach the vicinity of the circumferential surface of the column portion 431.

The proximal side flange portion 432b includes, as shown in FIGS. 12A and 12D, a protruding portion 438 formed in a part of the circumference of the annular shape, and the circular opening 433 formed in the central portion. The protruding portion 438 is formed in a shape that can make contact with one of the four corners inside of the magnetic cover. The protruding portion 438 includes an outlet groove 439 recessed toward the center of the proximal side flange portion 432b. The outlet groove 439 is used to draw out the winding end of the insulated shielded wire wound on the bobbin 430. Accordingly, the outlet groove 439 of the proximal side flange portion 432b is shallower than the inlet groove 435 of the distal side flange portion 432a.

The flange portions 432 each include an engaging device for connection of the bobbins 430. To be more detailed, proximal side flange portion 432b includes a recessed portion 437 of a generally annular shape formed on the surface on the proximal side, so that the annular portion of the distal side flange portion 432a can be fitted in the recessed portion 437, as shown in FIGS. 12C and 12D.

The bobbins 430 according to the fourth embodiment are set to different angular orientations with respect to the four corners inside of the magnetic cover, depending on which of the u-phase group, the v-phase group, and the w-phase group the bobbin 430 corresponds to. In other words, the inlet groove 435 and the outlet groove 439 of the bobbin 430 according to the fourth embodiment are located at different angular positions, depending on which of the u-phase group, the v-phase group, and the w-phase group the bobbin 430 corresponds to.

A plurality of bobbins 430 are serially aligned in the axial direction, with the proximal side flange portion 432b of the bobbin 430 and the distal side flange portion 432a of the adjacent bobbin 430 made to abut each other. At this point, the annular portion of the distal side flange portion 432a of the adjacent bobbin 430 is engaged with the annular recessed portion 437 of the proximal side flange portion 432b. In the case where the power source is three-phase AC for example, the coils are disposed in the order of u-phase, v-phase, and w-phase in the axial direction.

The coils of the same phase group are continuously wound. In the case where the power source is three-phase AC as in this embodiment, the respective coils of the u-phase group, the v-phase group, and the w-phase group are continuously wound over the plurality of bobbins 430. In other words, the respective coils of the u-phase group, the v-phase group, and the w-phase group are continuously wound on every third bobbin 430.

The initial portion of the insulated shielded wire to be wound around the bobbin 430 is introduced to the circumferential surface of the column portion 431 of the bobbin 430, through the inlet groove 435 of the distal side flange portion 432a, and wound around the column portion 431 to form the coil. The winding end of the coil is led out through the outlet groove 439 of the proximal side flange portion 432b, and passed through the corner portion in the magnetic cover so as to form the jumper wire, until reaching the next bobbin 430 on which the coil of the same phase is to be wound.

The linear motor according to the fourth embodiment provides, basically, the same advantageous effects as those provided by the second embodiment. In the linear motor according to the fourth embodiment, in particular, the annular portion of the distal side flange portion 432a of the adjacent bobbin 430 is engaged with the annular recessed portion 437 of the proximal side flange portion 432b in a predetermined angular orientation, when serially aligning the bobbins 430. Thus, the linear motor according to the fourth embodiment provides a distinctive advantage in that the positioning and connection of the bobbins 430 can be easily and securely achieved including micro adjustment of the position of the bobbin 430, and therefore the coil quality can be upgraded.

[Fifth Embodiment]

Figure 13:
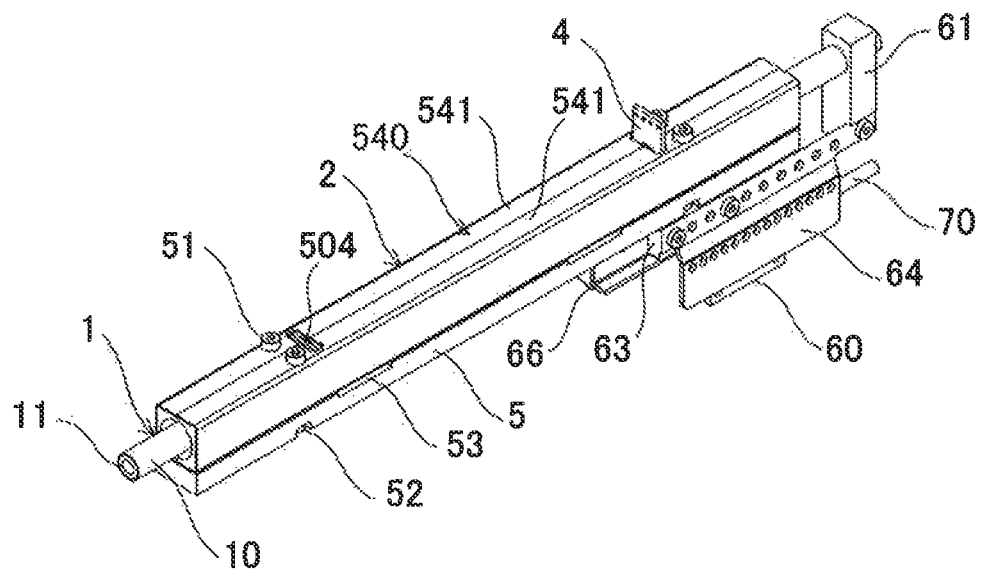
FIG. 13 is a perspective view showing a linear motor according to a fifth embodiment.
Figure 14A:
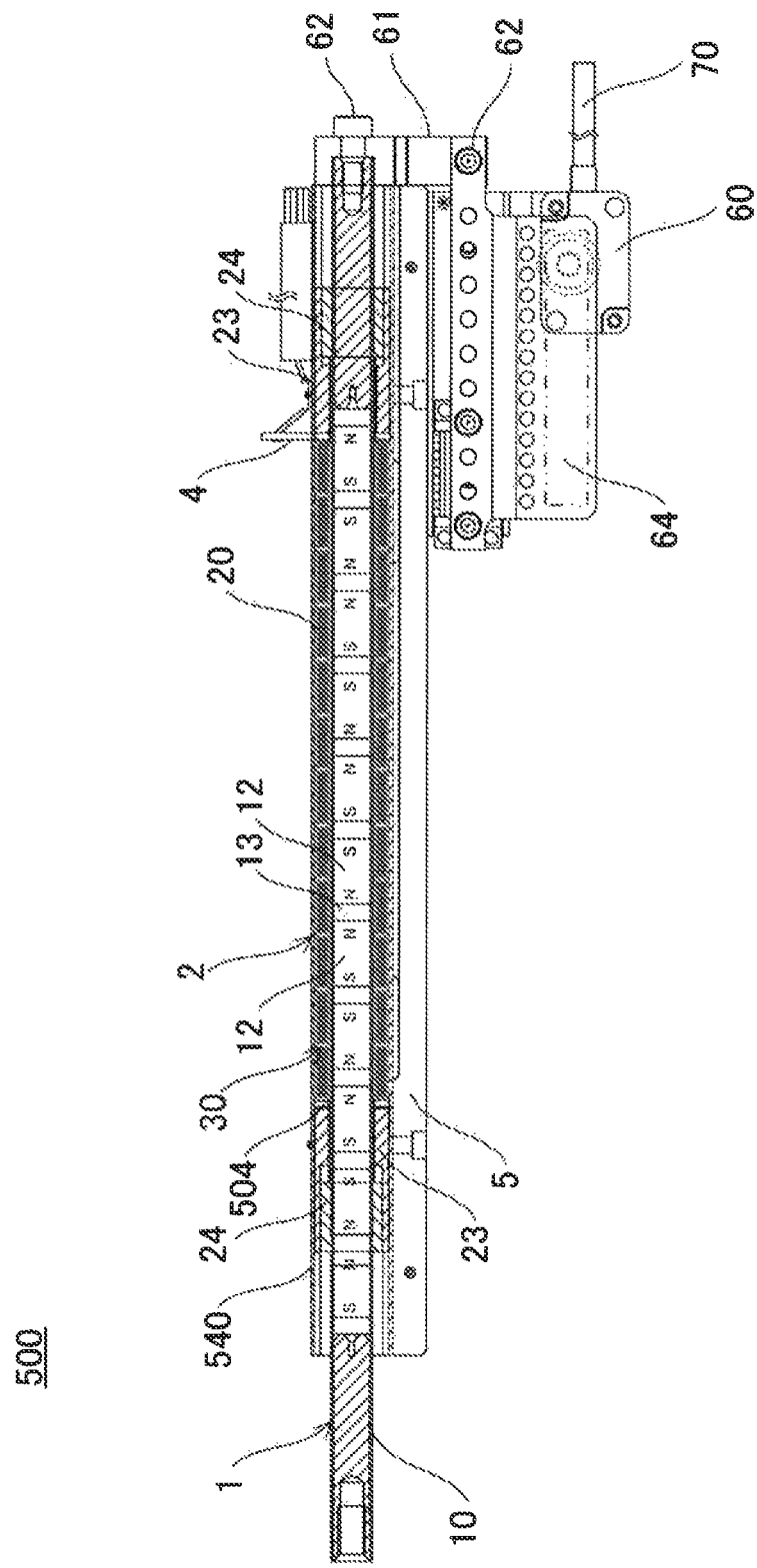
FIG. 14A is a vertical cross-sectional view showing the linear motor according to the fifth embodiment.
Figure 14B:
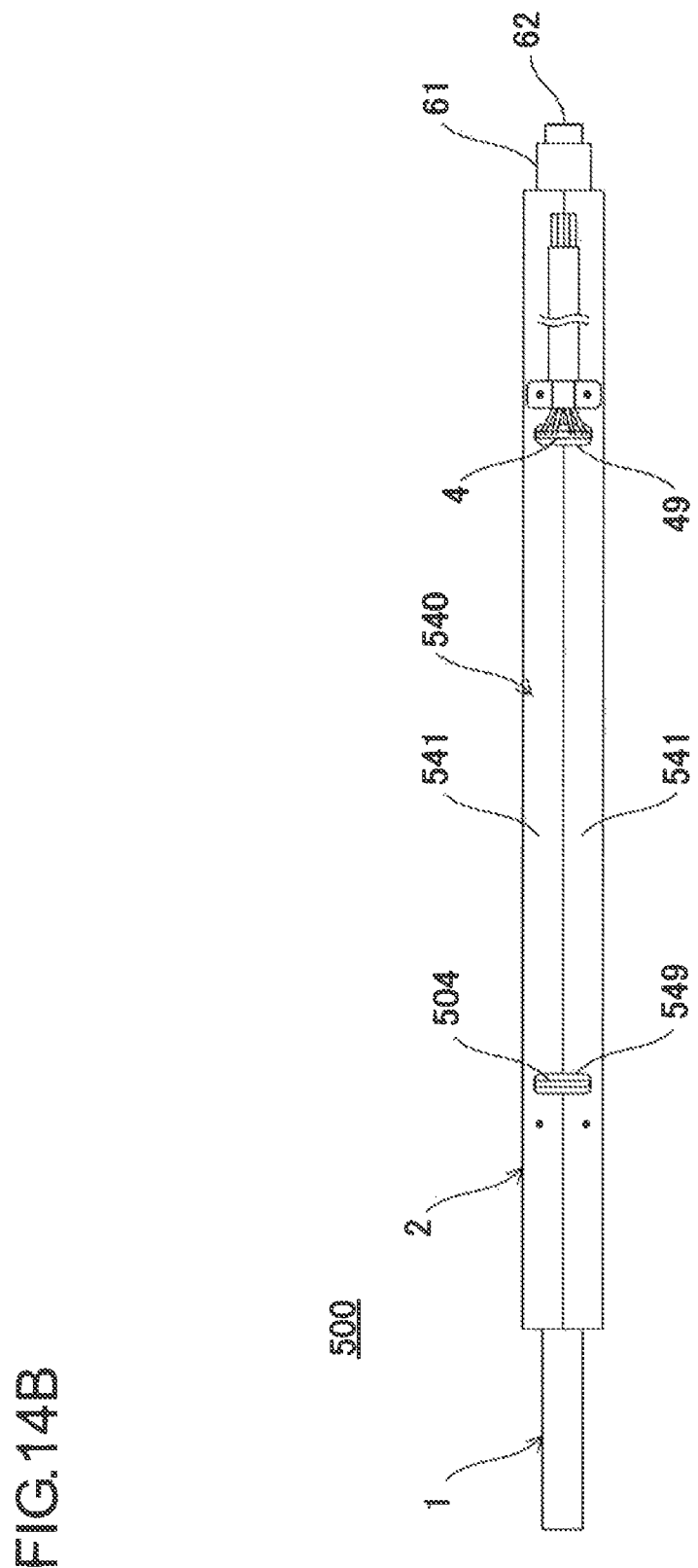
FIG. 14B is a top view showing the linear motor according to the fifth embodiment.
Figure 15A:
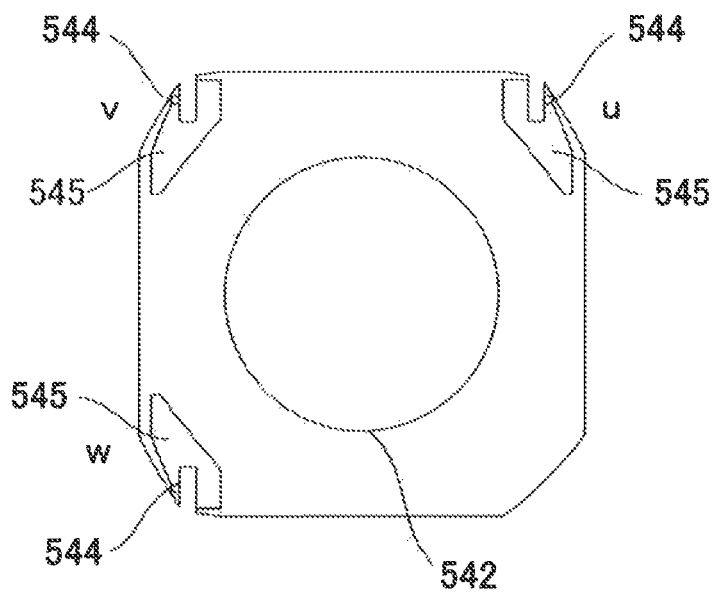
FIG. 15A is a front view showing a neutral point printed circuit board according to the fifth embodiment.
Figure 15B:
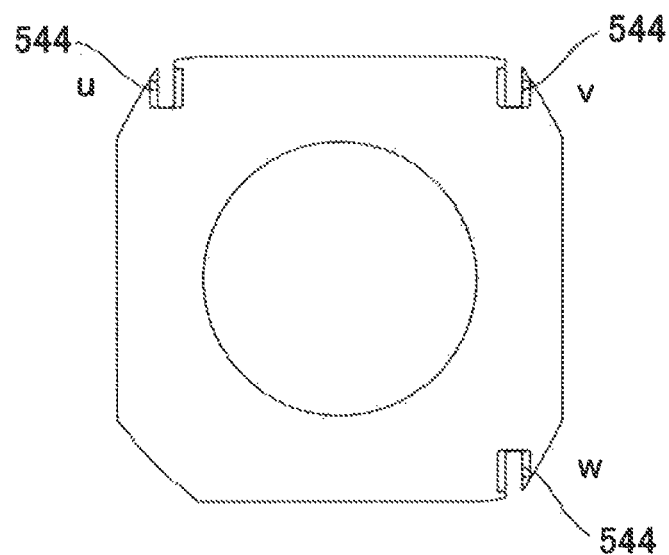
FIG. 15B is a rear view showing the neutral point printed circuit board according to the fifth embodiment.

Referring now to FIG. 13 to FIG. 15B, a linear motor according to a fifth embodiment will be described. FIG. 13 is a perspective view showing a linear motor according to the fifth embodiment. FIG. 14A is a vertical cross-sectional view showing the linear motor according to the fifth embodiment. FIG. 14B is a top view showing the linear motor according to the fifth embodiment. FIG. 15A is a front view showing a neutral point printed circuit board according to the fifth embodiment. FIG. 15B is a rear view showing the neutral point printed circuit board according to the fifth embodiment. The same constituents as those of the first embodiment will be given the same numeral, and the description thereof will not be repeated.

As shown in FIG. 13 to FIG. 15B, the linear motor 500 according to the fifth embodiment is different from the first embodiment in further including a neutral point printed circuit board 504 located on the distal side in the axial direction, in addition to the printed circuit board 4 on the proximal side.

The neutral point printed circuit board 504 is, as shown in FIGS. 14A and 14B, erected perpendicular to the axial direction, between the coil 20 of the most distal position and the bush holder 23.

As shown in FIGS. 15A and 15B, the neutral point printed circuit board 504 is a generally rectangular plate-shaped member, and includes a printed circuit formed thereon for connecting an end portion of the coil at the neutral point. The neutral point printed circuit board 504 includes a circular opening 542 formed in the central portion, for passing the shaft 10 therethrough.

The neutral point printed circuit board 504 includes holding grooves 544 respectively formed at three of the four corners thereof so as to extend in the vertical direction, and lands 545 formed on the front face of the neutral point printed circuit board 504 around the respective holding grooves 44. The tap conductor of the coil 20 of each of the u-phase, the v-phase, and the w-phase is supported by a corresponding one of the holding grooves 544, and connected to the land 545 by soldering on the side of the front face. By the soldering, an end portion of the coil 20 of each of the u-phase, the v-phase, and the w-phase is connected at the neutral point. Here, the illustrated positions of the u-phase, the v-phase, and the w-phase on the neutral point printed circuit board 504 are merely exemplary.

From the neutral point printed circuit board 504, the tap conductor of each phase group connected thereto is continuously wound on the plurality of bobbins 30 to form the coil 20.

As in the first embodiment, the proximal side printed circuit board 4 is provided at the position corresponding to the bobbin 30 of the most proximal position. The tap conductor connected to the neutral point printed circuit board 50 is wound around the plurality of bobbins 30 to form the coil of each phase group, and then the terminal wire of each phase group is connected by soldering to the printed circuit board 4 on the proximal side.

A magnetic cover 540 according to the fifth embodiment includes a cutaway portion 549 formed on the distal side of the upper face, through which the neutral point printed circuit board 504 is to be passed in an erected position perpendicular to the axial direction. The neutral point printed circuit board 504 is shorter in the vertical direction than the printed circuit board 4 on the proximal side.

The fifth embodiment provides, basically, the same advantageous effects as those provided by the first embodiment. In particular, the linear motor according to the fifth embodiment includes the neutral point printed circuit board 504 in addition to the printed circuit board 4 on the proximal side, and the tap conductor of the coil 20 of each phase is connected to the neutral point printed circuit board 504 on the distal side in the axial direction. Therefore, the linear motor according to the fifth embodiment provides an advantage in that the wiring work for the section subsequent to the neutral point printed circuit board 504 can be easily performed.

Further, the bobbin 230, 330, and 430 according to the second to the fourth embodiments may be applied to the linear motor 500 according to the fifth embodiment.

Although the preferred embodiments of the present invention have been described as above, it is to be understood that those embodiments are merely exemplary and in no way intended to limit the scope of the present invention. The foregoing embodiments may be modified in various manners without departing from the scope of the present invention.

The entire disclosure of Japanese Patent Application No. 2013-197463 filed on Sep. 24, 2013 including specification, claims, drawings and summary are incorporated herein by reference in its entirety.

What is claimed is:

1. A multi-phase linear motor comprising:
an excitation unit including a shaft and a plurality of permanent magnets located in the shaft; and
an armature including a plurality of phase groups, each phase group comprising a plurality of coils surrounding the excitation unit, and a magnetic cover covering the coils,
wherein the plurality of coils of each one of the plurality of phase groups are continuously wound over a plurality of insulative bobbins, and a jumper wire between the coils and a terminal wire of the coils in a same one of the phase groups that are continuously wound are disposed in a same corner portion in the magnetic cover, and a jumper wire between the coils and a terminal wire of the coils in different phase groups that are continuously wound are separately disposed in different corner portions in the magnetic cover, and the terminal wire of each phase is connected to a circuit board.

2. The linear motor according to claim 1,
wherein the jumper wire between the coils and the terminal wire of each phase is supported by a part of a flange portion of the bobbin.

3. The linear motor according to claim 1,
wherein the circuit board is erected with respect to an axial direction of the shaft.

4. The linear motor according to claim 1,
wherein the magnetic cover is mounted on a frame, the frame including a cooling path that allows cooling air to pass therethrough.

5. The linear motor according to claim 1,
wherein the bobbin includes a column portion serving as a core on which the coil is wound, and a pair of flange portions that delimit a winding width of the coil and serve as insulating spacers between the coils, and
one of the flange portions includes an inlet groove for introducing an insulated shielded wire to a circumferential surface of the column portion, and the other flange portion includes an outlet groove for drawing out the insulated shielded wire from the coil.

6. The linear motor according to claim 5,
wherein the bobbin includes a support groove formed on one of the flange portions for supporting the jumper wire between the coils.

7. The linear motor according to claim 6, wherein:
the inlet groove is formed in one of a plurality of flange corner portions included in the one flange portion; and respective support grooves are disposed in each of the other plurality of flange corner portions included in the one flange portion.

8. The linear motor according to claim 7, wherein the jumper wire of each different phase group is supported by the support groove of a different one of the flange corner portions.

9. The linear motor according to claim 5, wherein respective outlet grooves are disposed in each of a plurality of different flange corner portions included in the other flange portion.

10. The linear motor according to claim 9, wherein the jumper wire of each different phase group is supported by the outlet groove of a different one of the other flange corner portions.

11. The linear motor according to claim 5, wherein the flange portions of the bobbin are formed into an approximately rectangular shape.

12. The linear motor according to claim 1, wherein the bobbin includes an engaging device formed on each of the flange portions for connecting the bobbins.

13. The linear motor according to claim 12, wherein the engaging device of the bobbin includes an engaging hole formed in one of the flange portions and an engaging projection formed on the other flange portion.

14. The linear motor according to claim 12, wherein the engaging device of the bobbin includes a recessed portion formed in one of the flange portions, and the recessed portion is engaged with the other flange portion in a predetermined angular orientation.

15. The linear motor according to claim 1, wherein the circuit board includes a holding groove for holding an end portion of an insulated shielded wire of each phase, and a land formed around the holding groove for connection by soldering.

16. The linear motor according to claim 15, wherein the circuit board includes a through hole through which the shaft is passed, and a land formed around the through hole for connecting a ground wire by soldering.

17. The linear motor according to claim 1, further comprising a neutral point circuit board located on a distal side with respect to the circuit board, for connecting a conductor of the coil of each phase group on the distal side.

18. The linear motor according to claim 1, wherein the circuit board is interposed between the coil and a bush holder in an erected position.

19. The linear motor according to claim 1, wherein the magnetic cover includes a cutaway portion that allows the circuit board to be inserted therein in an erected position.

* * * * *